Patented Apr. 21, 1936

2,038,440

UNITED STATES PATENT OFFICE 2,038,440

MANUFACTURING PROCESS FOR OBTAINING HYDROGEN BY CONVERSION OF WATER GAS

Giulio Natta, Pavia, Italy

No Drawing. Application June 7, 1934, Serial No. 729,477. In Italy June 13, 1933

10 Claims. (Cl. 23—213)

The process for obtaining hydrogen from water gas by the catalyzed reaction between carbon monoxide and steam has developed over a long period into an important industry.

Hitherto this reaction was generally carried out under atmospheric pressure in apparatus of very large size and with a large quantity of catalyst, mostly formed of iron or chromium oxides, etc.

Considerable economic advantages can be secured by carrying out the reaction under a higher pressure, inasmuch as:

1. The size of the plant would be reduced, due to the smaller volume of the compressed gases.
2. A smaller amount of catalyzer would be needed.
3. A readier heat recovery would be obtained, the quantity of heat transmitted per unit of surface of the heat exchangers being greater.

It is possible besides to recover a large amount of the latent heat by condensing the excess steam used in the process, which steam at higher pressures condenses at a higher temperature.

4. The necessity of compressing the gas after the conversion for eliminating the carbon dioxide ($CO_2$) is avoided inasmuch as the gas resulting from the reaction is already compressed.

Besides this the energy required for compressing the gas before the reaction is less than that required subsequently thereto, because during the reaction the volume of the non-condensing gas increases. The steam required for the conversion need not be compressed with compressors like the carbon monoxide, as it can be easily obtained under high pressures direct from the boiler.

The practical achievement of the reaction under pressure encounters, however, serious difficulties of a chemical nature, inasmuch as the higher pressure favours certain noxious secondary chemical reactions, which cause a volume contraction. In fact by using a high pressure the same catalysts, which are usually employed in the conversion at atmospheric pressure (metals or oxides of metals of the 6th, 7th and 8th group in the periodical system and particularly iron), besides facilitating the useful reaction:

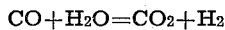

$$CO + H_2O = CO_2 + H_2$$

also favor to an extent depending upon the pressure, the noxious reaction:

$$CO + 3H_2 = CH_4 + H_2O$$

and, on operating with a deficiency of steam, also the following reaction, equally noxious:

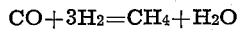

$$2CO = CO_2 + C$$

The two last reactions, both greatly exothermic, overheat and soil the catalyst, causing it to be less active for the useful reaction for producing hydrogen.

Besides, the hydrogen containing $CH_4$ cannot be used for certain purposes, as for instance for the synthesis of ammonia.

All of the most active catalysts satisfactorily used in the conversion-reaction at atmospheric pressure cause also secondary reactions, when used under high pressures. Among the known catalysts, only a few, based on oxides of magnesium or of copper, exhibit in a minor degree this drawback, but these, on the other hand, have a catalytic activity very low with regard to the reaction for the production of hydrogen and therefore are not satisfactory.

It has been discovered that zinc carbonate or zinc oxide obtained from the carbonate at low temperatures, can be used as catalysts in the reaction for producing hydrogen under high pressure, without causing secondary reactions. Artificial zinc carbonate has, however, a non-lasting activity.

Smithsonite—a neutral mineral zinc carbonate—exhibits on the contrary an important and lasting activity. Its use as a catalyst has been already patented for the process of synthesis of methanol.

Theoretically the really exceptional activity of zinc carbonate as a catalyst can be ascribed to the fact that it is dissociated into $CO_2$ and zinc oxide at temperatures varying between 300° and 500° centigrade, according to pressure, namely, at the temperatures corresponding to those at which the conversion of water-gas into yhdrogen can be practically effected. The zinc oxide resulting from the dissociation of the neutral mineral carbonate has a considerable absorbing power for carbon dioxide, much greater than other forms of zinc oxide and this fact might justify the catalytic effect now found on the reactions which result in the formation of carbon dioxide.

Practically it has been observed in very different tests and with greater gas velocities, at atmospheric pressure, that such gas compositions after conversion at 450°–480° centigrade, are very near to the values given by theory as calculated on the basis of the chemical equilibrium constant.

Upon operating under a pressure over 50 atmospheres and with gas velocities of 4000 to 5000 gallons per gallon of catalyst, the conversion takes place to a considerable extent at 380°–400° centigrade.

Practically, even when inert gases are present, one obtains ratios between the product of concentration of carbon monoxide and steam and the product of concentration of carbon dioxide and hydrogen, which are very close to the equilibrium constants at such temperatures.

When operating with sufficiently pure Smithsonites free from gangue, clay or other impurities containing iron, there is no formation of $CH_4$ even when using high temperatures.

Very slight quantities of iron which may subsist as impurities in the catalyst are not harmful but larger percentages might be harmful. The danger due to the iron impurity can be avoided by impregnating the catalyst with caustic alkalies (sodium or potassium hydroxide) or with alkali carbonates, without substantially reducing the activity of the catalyst.

Smithsonite is therefore a very good catalyst for the conversion of water-gas into hydrogen. Its low cost makes its use convenient for the production of hydrogen and for enriching in hydrogen the water-gas, especially when hydrogen should be free from $CH_4$ as required for synthetic ammonia and for methanol or for chemical hydrogenations.

Practically the reaction can be carried out at pressures slightly above atmospheric pressure (from 2 to 10 atmospheres) and also at much higher pressures—up to 20–30 atmospheres and even more. The heat developed during the reaction is sufficient for maintaining the catalyst at the required temperature for the reaction and the gas can be entirely preheated by the heat recovered from the gas exhausted from the catalytic apparatus.

Such heat recovery is easier and requires apparatus of smaller dimensions, the higher the operating pressure.

I claim as my invention:

1. A process for the production of hydrogen gas by conversion of water-gas, consisting in passing a mixture of water-gas and steam at a pressure above 50 atmospheres in a reaction zone at a temperature between 300 and 500° C. in contact with Smithsonite.

2. A process for the production of hydrogen, comprising effecting an interaction between carbon monoxide and steam at an elevated superatmospheric pressure and temperature in contact with Smithsonite.

3. A process for the production of hydrogen, comprising passing a mixture of water-gas and steam under an elevated pressure and at a high temperature over Smithsonite to effect a reaction between the water-gas and steam, and passing the reaction products in heat exchange relation with the mixture of water-gas and steam to preheat said mixture.

4. A process for the production of hydrogen, comprising contacting a mixture of water-gas and steam at an elevated superatmospheric pressure and temperature with Smithsonite which is at least partly calcined.

5. A process for the production of hydrogen, comprising passing a mixture of water gas and steam at an elevated pressure and at a high temperature in contact with Smithsonite moistened with a solution of an alkaline substance selected from the group consisting of an alkali metal hydroxide and an alkali metal carbonate.

6. A process for the production of hydrogen, comprising contacting a mixture of water-gas and steam at a superatmospheric pressure and at a temperature between 300 and 500° C. with a catalyst consisting of substantially pure Smithsonite.

7. A process for the production of hydrogen, comprising contacting a mixture of water-gas and steam at a superatmospheric pressure and at a temperature between 300 and 500° C. with a catalyst consisting of partially calcined Smithsonite.

8. A process for the production of hydrogen, comprising contacting a mixture of water-gas and steam at a superatmospheric pressure and at a temperature between 300 and 500° C. with a catalyst consisting of Smithsonite containing iron and moistened with an alkaline reacting solution of an alkali metal compound.

9. A process for the production of hydrogen, comprising contacting a heated mixture of carbon monoxide and steam with Smithsonite.

10. A process for the production of hydrogen, comprising contacting a mixture containing essentially carbon monoxide and steam at a superatmospheric pressure and at a temperature between 300 and 500° C. with a catalyst consisting of substantially pure Smithsonite.

GIULIO NATTA.